INVENTORS.
WILLIAM P. CHAPMAN
CARLETON C. SMITH
BY
Andrus & Starke
ATTORNEYS.

United States Patent Office 3,529,176
Patented Sept. 15, 1970

3,529,176
BINARY LOGIC CODED CONTROL
William P. Chapman, Milwaukee, and Carleton C. Smith, Menomonee Falls, Wis., assignors to Johnson Service Company, Milwaukee, Wis., a corporation of Wisconsin
Original application Aug. 21, 1962, Ser. No. 218,386, now Patent No. 3,300,759. Divided and this application Aug. 8, 1966, Ser. No. 571,111
Int. Cl. H03k 19/22
U.S. Cl. 307—218
3 Claims

ABSTRACT OF THE DISCLOSURE

A system employing a binary code is used to establish control for selection of a plurality of remotely located devices. The decoders in the system includes a plurality of dual state switching elements which are interconnected in an AND logical system. The AND gates have two operating conditions, one for each bit of the binary code.

---

This application is a division of application Ser. No. 218,386 which was filed Aug. 21, 1962 and entitled Binary Logic Coded Control. This invention relates to a method and apparatus for transmitting data from a plurality of remotely located means to a control or recording center in a selective manner.

Control centers are often provided to control or supervise the functioning or condition of a number of remote machines, processes or the like. For example large installations of heating and air conditioning systems for one or more buildings may include temperature sensing means such as thermocouple elements dispersed through the various areas of the systems. The temperature sensing means constitute signal generators having output signals related to the temperature of the surrounding environment. The temperature related signals are individually transmitted to a control center from which the operation and condition of the complete system is supervised and monitored. Generally, rather than having separate recording means for the great number of individual sensing means, one or more recording means is provided for selective connection to the separate sensing means.

Various systems have heretofore been provided for selective connection of sensing means to a common recording means. Individual wiring of the numerous sensing means to the control center can be provided. Transmission in this manner is obviously extremely expensive because of material installation and maintenance costs associated with such a great number of separate transmission wires particularly where the sensing means are widely separated from the control center. Expansion of the system is also quite expensive because of the necessity of inserting additional wiring into the system. To avoid certain of the problems inherent in direct connection, various coded systems have been proposed. Telephone dialing systems such as shown in U.S. Pat. 2,712,641 have been suggested for selecting different remote locations and separately connecting them to a data transmittal line. Frequency sensitive systems for remote control, such as shown in U.S. Pat. 2,993,194, have also been proposed.

Prior selection systems however employ relatively complicated operating devices which result in a substantial and costly initial investment. The complex operational equipment is often subject to malfunctioning and requires specially trained personnel for servicing which creates high maintenance cost.

The present invention is particularly directed to a reliable and low cost system employing a binary code for establishing remote control for selection of a plurality of remotely located devices with minimum field wiring. The present invention is particularly adapted for gathering of information from a plurality of remote transmitting devices and is therefore described hereinafter as applied to such an installation. However, the invention can be applied to other remote control systems.

In accordance with the present invention, a control center is connected to a plurality of input points or signal transmitting devices through a common data transmission cable. The transmitting devices are selectively connected to the common transmission cable by decoders forming a part of a selection control circuit and employing a binary code for actuating decoders. Each decoder includes a plurality of dual state switching elements having two operating positions or conditions one for each bit or position of the binary code employed in the system. The operating conditions of the elements are related to the alternate characteristics, conventionally designated to the decimal digits 1 and 0, of the binary system and thus the switching elements of each decoder represent a binary number. The particular binary number of a decoder is established by means at the decoder placing certain of the switching elements in one operating condition corresponding to the one binary characteristic and having the other switching elements in the second operating condition.

An encoder at the control center is connected by a common control cable having one selection wire or line for each bit to the several decoders. The selection wires corresponding to the switching elements in the second operating condition are coupled thereto. The encoder includes means to selectively establish signals on the selection lines in accordance with the binary codes and to trigger the connected switching elements to the first operating condition.

The switching elements are interconnected in an "AND" logical system such that each must be placed in the same operating status or condition to enable an output circuit. The decoder, when properly actuated, connects the associated transmitting device to the common transmission cable or otherwise conditions a connecting circuit for connection of the associated transmitting device to the common transmission cable.

The decoders for all binary codes below the maximum code number have the switching elements biased to the first operating conditions independently of the selection lines for the corresponding bits of the binary code. These code-free selection lines are interconnected as a safety or disconnect system with the decoders and more particularly are connected to the switching elements in a manner disenabling the corresponding decoder when a signal on the other selection lines, as a result of encoding a different code, tends to operate the decoder. For example, in the three bit binary code system, when the encoder is set to the code binary number 111, all three selection lines in the common cable tend to actuate the switching elements of all decoders connected thereto. However, the signal on the code-free selection lines as related to the other decoders disenables all except for the maximum binary number coded decoder.

The present invention allows selection of a great number of remote controlled points with minimal wiring and with reliable and low cost operating components. The number of selections is equal to the base number raised to the power of the number of bits or positions in the binary code. Generally, a reduction of one from the total possible selections is required because the first or initial binary number corresponds to standby condition of the system. In a three bit binary code, seven selections can be made with three wires. By the mere addition of one wire, the number of selection is raised to 15 and so forth. Further, by dividing the total points to be selected into primary groups each having a plurality of secondary groups, an exceedingly large number of points can be selectively connected to the transmission or control circuit.

Consequently, the original circuit can be wired to provide for and anticipate future expansion within reasonable limits. For example, if seven remote points or groups are presently in the system, the addition of a single wire allows expansion to practically double the original point and the addition of two wires allows the addition of four times the original points.

Preferably, transistors are employed as the switching elements for simplicity of construction as well as for purposes of reliability and long life and of ease of maintenance and repair. Certain of the transistors within a decoder have the input circuits complete and are biased to conduct. The other transistors have the input circuits open and are connected by the selection encoded cable to a bias control at the control center. The latter transistors are biased to conduct only when a proper signal is provided on the corresponding selection line by operation of the encoder.

The input encoding circuit at the central control station preferably is in the form of a diode matrix having output lines connected one each to the selection lines and input lines, one for each binary number. The input lines include control switches to selectively and separately actuate one input line and thus encode the selection lines to the corresponding binary number.

The selection system may be operated with low voltage signals and inexpensive small diameter wire such as telephone signal wire. The use of the small low voltage wire also reduces the problems and work of installation.

In accordance with another very important feature of the present invention, a supervisory control is incorporated in the selection system. A supervisory wire or line is provided in the common control cable. Each decoder includes a control element operatively connected to the supervisory wire in response to the output of the decoder. The supervisory wire is connected at the control center in a comparison circuit in which a separate control element associated with each binary number is inserted by the encoding circuit. If the control elements do not have the necessary relationship, the comparison circuit establishes a warning signal or control at the central station and indicates that a selection is established other than that desired and set up at the control center. This indicates faulty transmission cables, components or the like. The system only requires the addition of single wire into the field wiring for present and future remote points.

Although the present invention is particularly adapted to electrical transmission systems, it may also be adapted to pneumatic systems.

Further, each decoder employed is of a basic similar construction. The several elements may therefore be produced with modular construction and with a subsequent proper interconnection of similar elements to the base module providing the desired coding thereof. Complete maintenance is thereby reduced in time and expense and the inventory of components required is maintained at a very minimum.

The present invention thus provides a control system employing a minimal number of transmission wires and readily and economically permitting initial wiring in anticipation of future expansion of the system within reasonable limits. The selection of any particular remote location is continuously supervised to immediately indicate an incorrect circuit correction.

The drawings furnished herewith illustrate the best mode presently contemplated for carrying out the invention.

In the drawings:

FIG. 3 is an elevational view of a base module for a decoder shown in FIGS. 1 and 2.

Figure 1:
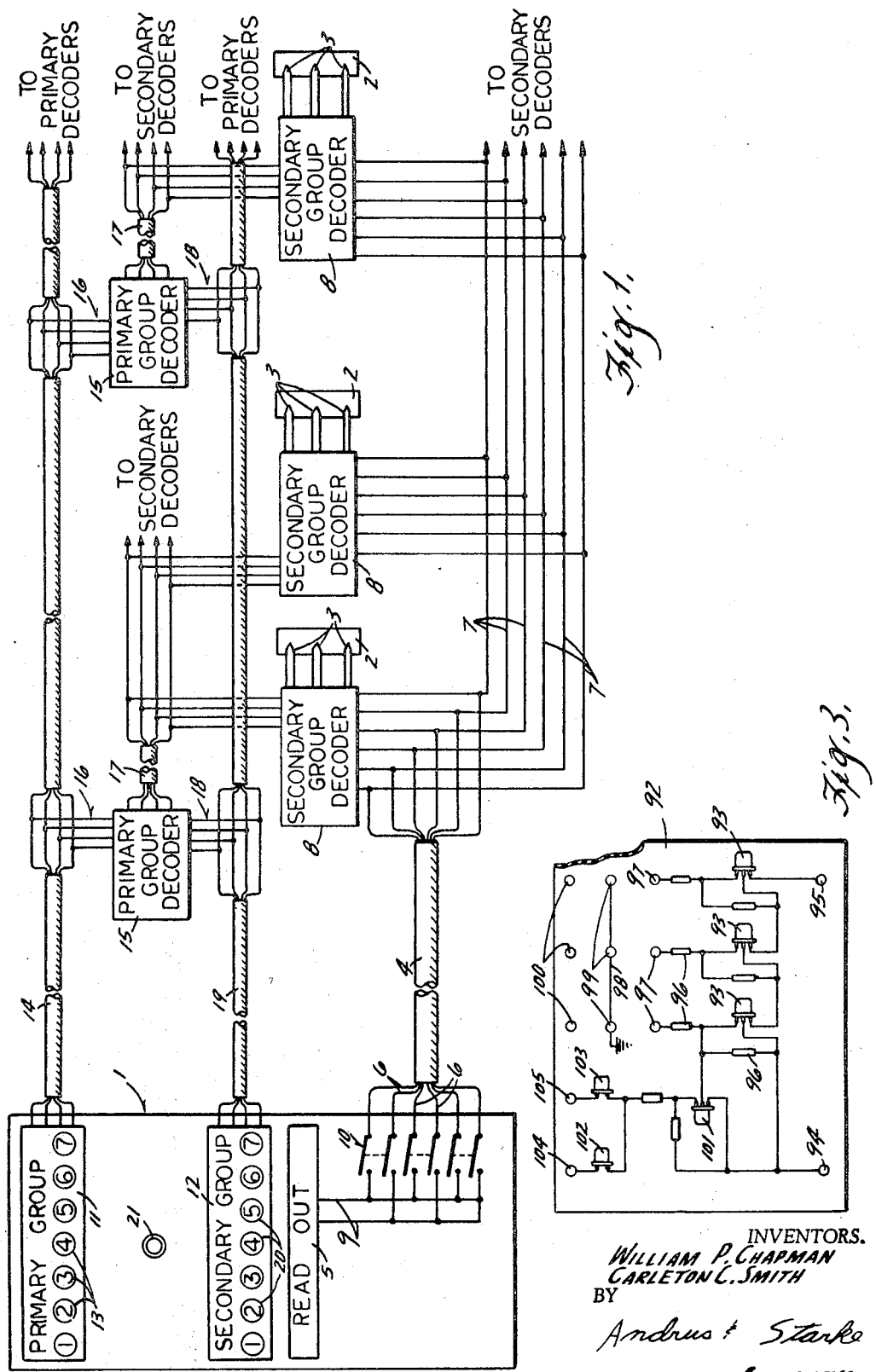
FIG. 1 is a diagrammatic illustration of a portion of an information transmittal system including an input data selection circuit constructed in accordance with the present invention.

Referring to the drawings and particularly to FIG. 1, a temperature monitoring system is illustrated including a control center 1 provided at a convenient location and at which temperature information is to be selectively gathered from a plurality of remote data transmission locations or points 2 under control at the control center. The data transmission points 2 are generally in a related area such as a building, not shown, remote from control center 1. Each transmission point 2 is shown with three separate thermocouples 3 which establish electrical signals proportional to the temperature at a particular location. A common data transmission cable 4 is provided for selective and individual transmission of the output of thermocouples 3 to a temperature readout 5 at the control center 1. The data transmission cable 4 includes a separate pair of transmission lines 6 for each of the thermocouples 3 at the various transmission points 2. The pair of transmission lines 6 of cable 4 are connected to the corresponding thermocouples 3 at each point 2 by coupling lines 7 which are selectively connected to the three thermocouples 3 at each of the data transmission points 2 by secondary decoders 8. The transmission lines 6 are connected at the control center 1 in parallel to a pair of input lines 9 to readout 5. Data transmission switches 10 are provided in each of the transmission lines 6 at the control center 1 for the selective and individual operative connection of the corresponding lines 6 to the input lines 9 of readout 5.

The several transmission points 2 are individually and separately connected by actuation of the unique decoders 8 to the transmission cable 4 and the thermocouples 3 are then separately and sequentially connected by operation of switches 10 to the readout 5 to provide a separate reading of the output of each thermocouple.

The data transmission points 2 are selectively connected to the coupling lines 7 and the common data transmission cable 4 through a unique selection circuit employing a binary code system.

In the illustrated embodiment of the invention, the several transmission points 2 are divided into primary groups, of which two are partially shown, having a plurality of secondary groups. As appears hereinafter, the maximum number of secondary groups within each primary group and of transmission points 2 within each secondary group is determined by the maximum binary number employed in the binary code of the system. In the illustrated embodiment, a three bit binary code is used for each primary group and secondary group and produces eight binary code numbers for each. The first binary number 000 corresponds to a standby condition and is not otherwise employed. Consequently, each primary group may control seven secondary groups each of which may control seven transmission points 2. Although only three transmission points 2 are shown in FIG. 1, a total of 49 different points may be provided in the illustrated embodiment of the invention as a result of the seven primary groups each of which includes seven secondary groups.

A primary group control panel 11 is provided at the control center 1 and is used for selectively enabling a secondary group control panel 12. The connecting of the primary group control panel 11 and the secondary group control panel 12 in the total circuit is similar and the connection of only two of seven possible primary groups and associated three of the possible 49 secondary groups is shown for purposes of simplicity and clarity of explanation of this invention.

Figure 2:
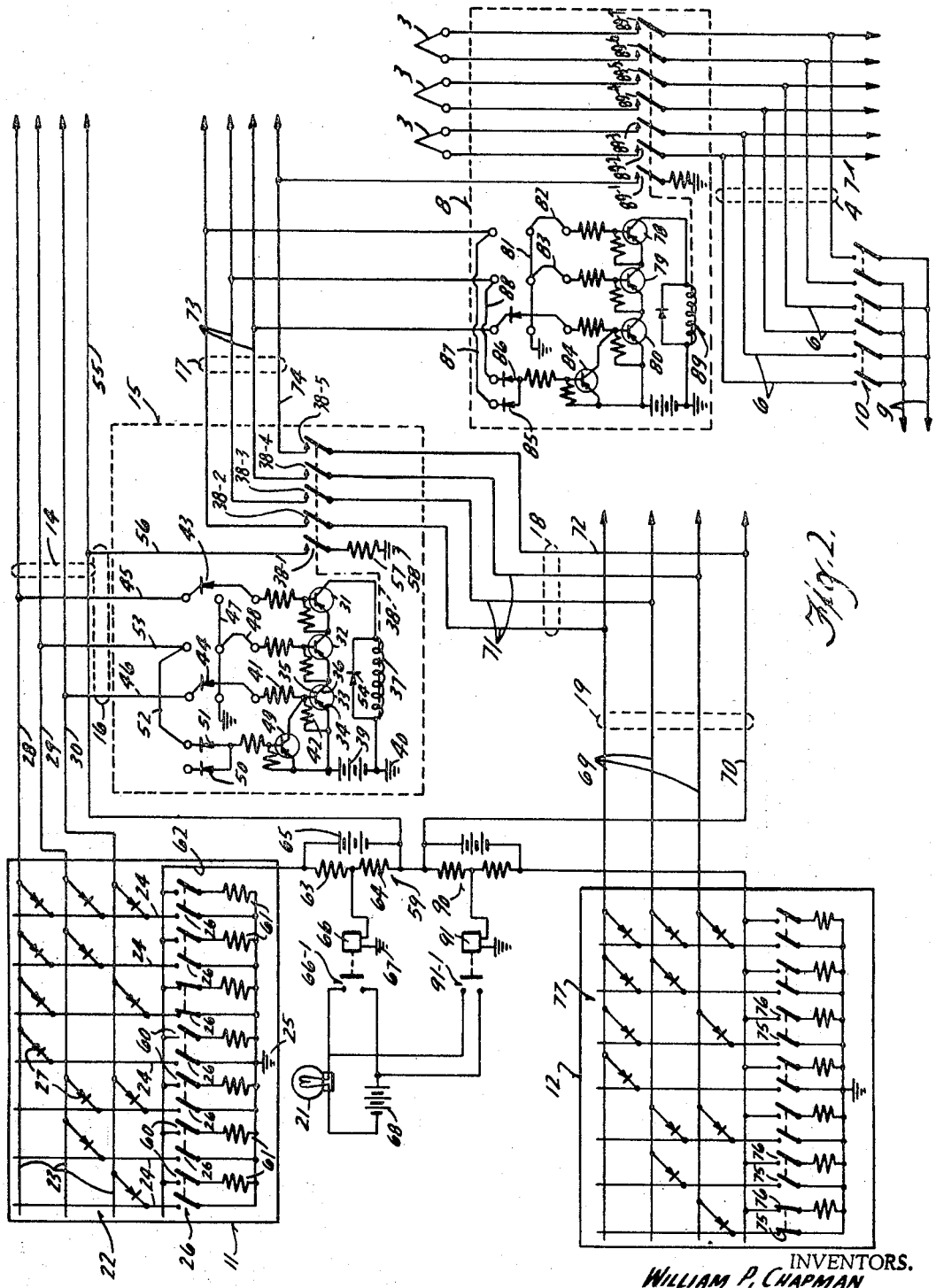
FIG. 2 is a schematic circuit diagram of FIG. 1 to more clearly illustrate the preferred construction of the components of the present invention.

Primary group control panel 11 includes seven push buttons 13, one for each of the seven possible binary code numbers and identified in the drawings by the numerals 1–7. The push buttons 13 control switches, shown in FIG. 2 and hereinafter described, which are connected into a selection circuit including an encoding system at the panel 11, as also shown in FIG. 2, which is connected by a primary group wiring cable 14 to a plurality of primary group decoders 15 located in the general area of the associated secondary groups for selectively coupling secondary groups to the secondary group control panel 12.

Decoder 15 includes an input cable 16 connected to the primary group wiring cable 14. A secondary group selection cable 17 connects the decoder 15 to seven secondary group decoders 8, one for each group of the data transmission points 2 associated with the secondary group which is associated with that particular primary group decoder. A branch cable 18 connects the decoder 15 to a secondary group wiring cable 19 from the secondary group control panel 12.

The secondary group control panel 12 includes seven push buttons 20 similarly identified by the numerals 1–7, respectively. Push buttons 20 control switches, shown in FIG. 2, connected by the secondary group wiring cable 19 to the secondary group decoders 8 for selective actuation of the decoders 8 and connection of the related data transmission points 2 to the readout 5.

The temperature at the various input or transmission points 2 is selectively read by proper selection of push buttons 13 and 20. For example, depressing of push button 13 of panel 11 for the primary group number five actuates the corresponding primary group decoder 15. The decoder 15 completes the circuit between the secondary group wiring cable 19 and the selection cable 17 which is connected to all of the secondary group decoders 8 making up the primary group number five. The push button 20 for the desired group of transmission points 2 is then depressed to select and operate the particular secondary group decoder 8 associated with the coded transmission point 2. The decoder 8 completes the circuit between the coupling lines 7 and the thermocouples 3. The data transmission switches 10 are then actuated one at a time and the output of the respective thermocouples 3 transmitted to the readout 5.

As more fully shown in FIG. 2, a supervisory alarm or signal circuit including a lamp 21, or other suitable signal means, is suitably mounted at the control center 1. Lamp 21 is normally off. If other than the desired decoders 15 and 8 is connected in the circuit due to a faulty operation of the selection circuit, lamp 21 is lit to give an immediate indication of the malfunctioning.

Referring particularly to FIG. 2, a preferred circuitry is illustrated employing transistors and diodes in the several components of the block diagram of FIG. 1.

As previously noted, a three-bit binary coded system has been selected for illustrative purposes. In the binary system, alternate circuit conditions establish the bit characteristic in each position of the binary number. A closed circuit and an open circuit are employed to represent the binary characteristics 1 and 0, respectively. In a three position or bit binary code, eight possible number combinations begin with 000 and end with 111. The 000 binary number in the present invention is related to the standby position of the selection circuit and is not employed as a selection code number wherein at least one code circuit must be established by operation at the control center 1 to operate a decoder 8 or 15. The push buttons 13 and 20 are similarly each related to one of the other seven binary numbers.

The primary group control panel 11 includes a primary group encoding diode matrix 22 having three output lines 23 connected to the wiring cable 14 and seven input lines 24 separately connected to a common ground 25 by primary group selection switches 26, one in each line 24. The latter switches 26 are individually operated by push buttons 13. Diodes 27 interconnect the output lines 23 to the input lines 24 in accordance with a binary system, with the input line 24 to the left in FIG. 2 being the first usable code binary number 001 and with the input lines to the right increasing by one. The output lines 23 are shown vertically spaced with the first binary bit at the top, the second binary bit in the middle and the third binary bit at the bottom thereof.

The encoded output appears electrically as a ground at each output line 23 related to the binary characteristic 1 and as an open or dead line at each output line 23 related to binary characteristics 0. Thus, the number 1 input line 24 is connected by a single diode 27 to the lowermost output line 23 and encodes the lines 23 to the binary number 001 when switch 26 is closed. The number two switch 26 grounds only line 29 corresponding to the binary code number 010 and so on through the number seven switch 26 wherein all three output lines 23 are connected to the ground 25.

The primary group wiring cable 14 includes three selection lines 28, 29 and 30 connected respectively to the three output lines 23 of the encoding matrix 22 and are correspondingly encoded.

Each of the switches 26 therefore uniquely completes the connections of lines 28, 29 and 30 to ground 25 and forms a register retaining the possible binary coding of lines 28, 29 and 30 of cable 14.

The primary group wiring cable 14 is connected to seven primary group decoders 15, each of which is constructed to respond to a different one of the three bit binary codes associated with diode matrix 22.

Each decoder 15 generally includes three transistors 31, 32 and 33 for the three binary bits with transistor 31 being related to the first bit, transistor 32 to the second bit and transistor 33 to the third bit. Each of the illustrated transistors 31, 32 and 33 is a PNP type transistor connected in a common emitter configuration and having an emitter 34, a base 35 and a collector 36. The three transistors 31–33 have their outputs series connected through the respective emitters 34 and collectors 36 in series with a relay coil 37 of a control relay 38 across the terminals of a biasing and operating battery 39. Relay 38 includes a plurality of contacts for connecting the secondary group decoders 8 to the secondary group control panel 12 for operation and selection of the transmission data points 2. The transistors 31, 32 and 33 form an "AND" logic circuit and relay coil 37 is therefore energized only when all three of the transistors 31, 32 and 33 are biased to conduct.

One side of the biasing and operating battery 39 is grounded as at 40 to provide a common return path for other operating components presently to be described.

Each of the transistors 31, 32 and 33 is provided with a base resistor 41 connected to the corresponding base 35 and a bias resistor 42 which is connected between each emitter 34 and base 35. When the free end of the base resistor 41 is grounded, and the emitter 34 is connected to the ungrounded side of the battery 39, the corresponding transistor is biased to conduct. The three base resistors 41 of transistors 31, 32 and 33 are connected either directly to ground or indirectly to ground through the diode matrix 22 such that they represent a binary code. For example, in FIG. 2, the illustrated primary group decoder 15 for the fifth secondary group is coded to the fifth binary number 101 and transistors 31, 32 and 33 are connected accordingly, as follows.

Transistors 31 and 33 have the corresponding base resistor 41 connected to the selection lines 28 and 30 of cable 14 by steering diodes 43 and 44 and individual lines 45 and 46 of input cable 16. Referring to the primary group encoding diode matrix 22 and particularly to the fifth switch 26 in the fifth input line 24, the transistors 31 and 33 are connected to the common ground 25 through diodes 27 joining lines 28 and 30 to the input line 24 and the switch 26. When the fifth switch 26 is closed, the circuit for the transistors 31 and 33 is similarly completed through the bias resistor 42, base resistor 41, the respective steering diodes 43 and 44, lines 45 and 46, the respective selection lines 28 and 30, the diode matrix 22 and switch 26 to the common ground 25. The base resistor 41 of the transistor 32 in this decoder 15 is directly connected to a common ground line 47 in the decoder by a suitable jumper lead 48. Transistor 32 thus has its bias circuit completed to ground but in the standby position conduction is prevented by transistor 33 which has its output connected between the battery and the emitter of transistor 32.

When the fifth switch 26 is closed, all three transistors 31, 32 and 33 conduct and current is supplied to the relay coil 37 of relay 38 and the associated contacts close to connect the proper secondary group decoders 8 to the secondary group control panel 12.

Referring particularly to FIG. 2, and comparing the connection of diode matrix input lines 24 to the output lines 23 for the fifth and seventh secondary groups, it is seen that the seventh secondary group switch 26 grounds the path for lines 28 and 30 in the same manner as fifth secondary group switch 26. The decoder 15 for the fifth secondary group is prevented from responding to closing of the seventh secondary group switch 26 by the following disconnect circuit.

The decoder 15 includes a disconnect transistor 49 similar to the transistors 31, 32 and 33. The output circuit of transistor 49 is connected in parallel with the bias resistor 42 of the transistor 33 and the input or bias circuit is connected at one end to the battery 39. A pair of disconnect diodes 50 and 51 is connected in open parallel circuits to the opposite end of the bias circuit for transistor 49. A jumper lead 52 connects the diode 51 to the third line 53 of the input cable 16. The line 53 is connected to the selection line 29 of primary group wiring cable 14. When the fifth secondary group switch 26 is actuated, the selection line 29 and therefore line 53 remain ungrounded and decoder 15 functions as previously described to actuate relay 38. However, when the seventh secondary group switch 26 is actuated, the selection line 29 and therefore the line 53 is grounded and completes the ground path for the input or bias circuit of the transistor 49 through the diode 51. Transistor 49 conducts and short circuits the bias resistor 42 in the input circuit of transistor 33. This prevents conduction through the transistor 33 which holds the circuit through the corresponding relay 38 open and prevents erroneous actuation.

The illustrated decoder 15 is basically a combination of "AND" logic established by transistors 31, 32 and 33 and "NOR" logic established by the diodes 50 and 51 and the associated disconnect transistor 49. The decoder 15 establishes an output and energizes relay 38 only when the "AND" logic circuit is completed and the "NOR" logic circuit remains open.

The base resistors 41 and bias resistors 42 are selected to have a resistance substantially greater than the resistance in the lines 45, 46 and 53 of cable 16 and the selection lines 28, 29 and 30 of cable 14. As a result, the effect of the resistance of the field wiring represented by cable 16 is essentially eliminated and assures proper operation of the decoder 15.

A protective diode 54 is connected across the relay coil 37 of relay 38 to prevent damaging inverse voltages upon opening of the circuit.

The relay 38 includes a plurality of normally open contacts 38–1, 38–2, 38–3, 38–4 and 38–5.

Contacts 38–1 constitute a supervisory control switch interconnected to energize the lamp 21 at the control center 1 in the event of any malfunction of the selection circuit in the following manner.

The cable 14 includes a supervisory line 55 which is connected by a lead 56 of cable 16 in series with contacts 38–1 and with a resistor 57 to a ground 58 at the decoder 15. The supervisory line 55 and resistor 57 are connected as one branch of a Wheatstone bridge 59 having the other three branches at the control center 1. Individual supervisory push button switches 60 are ganged one each with the switches 26 and are simultaneously operated therewith by the corresponding push button 13. Each of the switches 60 is connected in series with a resistor 61 between the common ground 25 and a common bridge line 62 to form the second leg of bridge 59. Fixed resistors 63 and 64 are connected to form the third and fourth leg of the Wheatstone bridge 59. A battery 65 is connected to the opposite input junctions or terminals of the bridge 59 and a relay 66 is connected across the output terminals, one of which is shown as a ground 67. Relay 66 includes a set of normally open contacts 66–1 connected in series with a battery 68 and the lamp 21.

The bridge 59 is completed by the closing of a switch 60 and the set of contacts 38–1 of a relay 38. If the resistor 57 at decoder 15 and resistor 61 at the encoding diode matrix 22 are not properly related, the bridge 59 is unbalanced and a voltage is applied across relay 66 which then closes its contacts 66–1 and energizes lamp 21. Resistors 57 and 61 of each secondary group controlled by the primary group control panel 11 are uniquely related. Therefore, if the relay 38 on any but the decoder 15 corresponding to an actuated push button 13 and its related switches 26 and 60 is actuated, the resistors 57 and 61 inserted in the circuit of the bridge 59 unbalance the bridge and the lamp 21 lights to immediately indicate the error. Similarly, if two decoders 15 are simultaneously actuated due to malfunctioning of the selection lines or other components, the bridge 59 is unbalanced. The single additional supervisory line 55 in the field wiring thereby provides continuous supervision of the operation of the primary group selection and increases the accuracy and reliability of the information gathered at the control center 1.

The operation of the bridge circuit 59 is made essentially independent of the resistance of the supervisory line 55 of cable 16 by proper selection of the resistance values for resistors 57, 61, 63 and 64.

In addition to the relay contacts 38–1, relay 38 controls the four sets of normally open contacts 38–2, 38–3, 38–4 and 38–5 which connect the input branch cable 18 from the secondary group wiring cable 19 to the selection cable 17 of the associated primary group decoder 15.

The secondary group wiring cable 19 is constructed similar to the primary group wiring cable 14 and includes three selection lines 69 one for each of the binary bits and a supervisory line 70 connected to corresponding selection lines 71 and supervisory line 72 of input cable 18. The illustrated selection cable 17 in FIG. 2 for each primary group of input points 2 is an extension of cable 18 and includes three selection lines 73 and a supervisory line 74 connected by relay contacts 38–2 through 38–5 to the respective lines 71 and 72. When the relay 38 is energized, the secondary group control panel 12 is connected to the several secondary group decoders 8 forming the primary group.

The secondary decoders 8 and the secondary group control panel 12 are constructed correspondingly to that of the primary group decoder 15 and panel 11.

The panel 12 includes a bank of secondary group selection switches 75 and supervisory switches 76 operated by push buttons 20 and corresponding to the bank of switches 26 and 60. A diode matrix 77 connects switches 75 to the three selection lines 69 of cable 19 and therefore to the lines 73 of cable 17 when the associated relay 38 is energized.

The decoders 8 include the decoding transistors 78, 79 and 80 coded to the respective encoding at the diode matrix 77 and are thus individually actuated by selection of a proper push button 20. For example, in FIG. 2, the secondary decoder 8 for the first secondary group is shown. The corresponding binary code number is 001 and consequently a correspondingly related selection line 73 is connected to transistor 80, related to the binary characteristic 1, for selective grounding by operation of the corresponding push button 20. Transistors 78 and 79, representing the binary characteristic 0, are connected to a common ground line 81 by suitable jumper leads 82 and 83. The second and third selection lines 73 are connected to a disconnect transistor 84 by diodes 85 and 86 by jumper leads 87 and 88, generally in the manner previously discussed with respect to diodes 50 and 51, and function to prevent erroneous operation of the decoder 8.

In the decoder 8 just described for binary number 001, only one of the selection lines 73 is grounded and the other two lines 73 remain open at the diode matrix 77. All of the other switches 75 which would ground the corresponding one line 73 would actuate the corresponding decoder 8 for the binary code 1. However, at the decoder number 1, both of the open selection lines 73 are connected respectively one each to the diodes 85 and 86. Consequently, if either one of these lines 73 is grounded, the disconnect transistor 84 in the decoder 8 conducts for binary number 001 and prevents actuation of this decoder 8 and malfunctioning of the system.

An output relay 89 of decoder 8 includes supervisory contacts 89-1 and data transmission control contacts 89-2 through 89-7.

Contacts 89-1 operate in conjunction with the switch 76 to complete a Wheatstone bridge 90 having an output relay 91. The contacts 91-1 of relay 91 are connected in parallel with contacts 66-1 of the relay 66 and light lamp 21 if the secondary group selection system malfunctions.

The contacts 89-2 through 89-7 connect the thermocouples 3 to the coupling lines 7 and thereby to the lines 6 of the cable 4, which constitutes the field wiring back to the control center.

The illustrated embodiment of the invention provides a data transmission circuit having a unique selection circuit for selecting the individual thermocouples 3 by proper and interrelated actuation of the push buttons of the primary group panel and the secondary group panel at the control center 1.

Decoders 8 and 15 employ the similar basic code elements with proper steering diode and ground connections for proper encoding thereof. As a result, the decoders 8 and 15 are readily mass produced as base modules in any convenient method such as printed circuit techniques. Referring particularly to FIG. 3, a basic module is illustrated as including a base plate 92 of suitable plastic or other insulating material. Three transistors 93 are mounted on the base plate 92 with spaced output terminals 94 and 95 for connection to one side of a battery and a control relay, not shown. Input circuit resistors 96 are also mounted on the base plate 92 in proper circuit connection to the transistors 93 and terminates in the input connection terminals 97 generally centrally of the plate. A common ground line 98 is provided on plate 92 with three terminals 99 aligned with terminals 97 for selective direct grounding of the transistors 93. Three selection line terminals 100 are provided in alignment with the terminals 97 and 99. A disconnected transistor 101 and diodes 102 and 103 are mounted to the left side of plate 92 and terminate in disconnect terminals 104 and 105. The module is coded by the proper connection of jumper leads and diodes connected to the respective terminals. This feature of the present invention permits relatively low initial cost and particularly low cost and rapid repair maintenance. Obviously, the inventory of components is reduced to a very minimum.

Although the illustrated embodiment of the invention is shown with manual operation, the invention can be readily adapted to automatic reading. Thus, a suitable stepping relay switch or electronic equivalent may be provided for actuating the primary group switches and the various secondary group switches in properly timed sequence for reading all of the individual thermocouples 3.

As previously noted the system has its greatest applicability and economy in connection with electrical systems. However, any pneumatic system employing a pressure transmitting fluid through suitable conduits can also be employed with the proper use of three-way valves, check-valves and the like for the transistors and the diodes of the illustrated embodiment of the invention. Further, vacuum tubes, relays and other switching means may be employed in the place of the transistors and the diodes although the transistors have certain advantages from the standpoint of life, size, economy, maintenance and the like.

Where transistors and similar components are used, the power requirements are minimal and the wire size can be correspondingly of small gauge. The small gauge wire is readily handled and installed in locations which would not readily accommodate high power lines. This results in maximum economy both in the cost of the wire and the installation thereof.

As previously noted, the addition of a single wire in the field wiring cable essentially doubles the number of remote locations which can be connected for remote selection from a control center. The addition of one or more low voltage lines for future expansion can be originally supplied because the wire is inexpensive. Further, if subsequent additional field wires are needed, the low voltage wire can be more readily installed.

The continuous and complete supervision of the selection of the remote points or devices is of great practical importance in providing reliable control which may be installed economically in the present invention.

The present invention thus provides a reliable and long life system at minimal cost to selectively seize a great number of remote locations for control or information transmittal with very minimum problems of field wiring.

Various modes of carrying out the invention are contemplated as being within the scope of the following claims particularly pointing out and distinctly claiming the subject matter which is regarded as the invention.

We claim:
1. In a binary decoder for selective connection to different binary control input lines for any one of a plurality of given binary numbers,
   a plurality of code elements having either of two operable conditions interconnected in an output logic circuit, one of said code elements being provided for each bit in the binary number,
   circuit means biasing selected first code elements of a first corresponding character in the binary number to a corresponding first operable condition of said two operable conditions and having the other second code elements in said second operable condition,
   a plurality of control input lines corresponding in number to said code elements with a different input line being individually connected to each of the second code elements to define code enabling control lines and with the other input lines defining disable control lines, said code enabling lines biasing the corresponding code elements to establish said second of said two operable conditions and said control lines being selectively actuable to change the input bias to said second code elements and establish the first operable condition as said first code elements, and
   disenabling means individually connected to each of the disable control lines and responsive to an input corresponding to an actuating input to make said code elements inoperable and thereby preventing establishing of said output logic circuit.

2. A binary decoder responsive to a multiple digit binary code comprising,
- a plurality of coding transistors one for each bit in said binary code,
- circuit means connecting said coding transistors in an output circuit of "AND" logic,
- circuit means biasing certain of said coding transistors to one state of conduction and other of said coding transistors to a second state of conduction to establish a binary number code representation,
- input means to coding transistors of a common state of conduction for reversing the state of conduction, and
- a transistor connected to said coding transistors to operatively disenable said coding transistors and having an input circuit to establish a combination of "AND" logic and "NOR" logic in said output circuit.

3. A binary decoder for actuation by a plurality of selection lines selectively connected to ground, one selection line being provided for each bit in a selected binary code comprising,
- a plurality of coding transistors connected in series circuit and each having an input connection which when grounded enables the corresponding transistor to conduct,
- a common ground line,
- means for selectively connecting said input connections of said transistors to said common ground line and to said selection lines, whereby said selection lines selectively includes code enabling first selection and disable second selection lines.
- a disconnect transistor having an output connected in parallel to the input of one of said transistors and having an input connection which when grounded enables the disconnect transistor to conduct and disenable said coding transistors, and
- means for selectively connecting said input connection of said disconnect transistor to said disable second selection lines whereby the decoder responds to encoding of a single binary code on said selection lines.

References Cited

UNITED STATES PATENTS

| | | | |
|---|---|---|---|
| 3,196,261 | 7/1965 | Schaefer | 307—217 |
| 3,393,325 | 7/1968 | Borror | 307—217 |

OTHER REFERENCES

Millan & Taub, McGraw-Hill 1956, Pulse and Digital Computer Circuits, p. 402.

J. B. Atkins, I.B.M. Technical Disclosure, vol. 7, No. 9, February 1965.

Abraham Pressman, Design of Transistorized Circuits for Digital Computers, Rider, 1959.

JOHN S. HEYMAN, Primary Examiner

D. M. CARTER, Assistant Examiner

U.S. Cl. X.R.

307—217; 328—119; 340—347